(12) United States Patent
Manithara Vamanan et al.

(10) Patent No.: US 11,843,997 B2
(45) Date of Patent: Dec. 12, 2023

(54) NETWORK SLICING FRAMEWORK FOR TIME-SENSITIVE PEER-TO-PEER NETWORKING

(71) Applicant: APPLE INC., Cupertino, CA (US)

(72) Inventors: Sudeep Manithara Vamanan, Nuremberg (DE); Yu-Ting Yu, San Francisco, CA (US); Biljana Badic, Munich (DE); Christian W. Mucke, Munich (DE); Lennert Niemeyer, Neuenkirchen (DE)

(73) Assignee: Apple Inc., Cupertino, CA (US)

(*) Notice: Subject to any disclaimer, the term of this patent is extended or adjusted under 35 U.S.C. 154(b) by 58 days.

(21) Appl. No.: 17/403,548

(22) Filed: Aug. 16, 2021

(65) Prior Publication Data
US 2022/0060858 A1    Feb. 24, 2022

Related U.S. Application Data

(60) Provisional application No. 63/067,022, filed on Aug. 18, 2020.

(51) Int. Cl.
*H04W 56/00* (2009.01)
*H04W 4/08* (2009.01)
*H04W 92/18* (2009.01)

(52) U.S. Cl.
CPC ......... *H04W 4/08* (2013.01); *H04W 56/0015* (2013.01); *H04W 92/18* (2013.01)

(58) Field of Classification Search
CPC ... H04W 4/08; H04W 56/0015; H04W 92/18; H04W 76/14
USPC ................. 370/351, 352, 353, 354
See application file for complete search history.

(56) References Cited

U.S. PATENT DOCUMENTS

| | | | |
|---|---|---|---|
| 9,843,986 B2* | 12/2017 | Poitau | H04W 76/14 |
| 2014/0094119 A1* | 4/2014 | Stojanovski | H04W 74/002 |
| | | | 455/41.1 |
| 2016/0088668 A1* | 3/2016 | Kim | H04W 4/70 |
| | | | 370/315 |
| 2016/0095099 A1* | 3/2016 | Yang | H04L 5/00 |
| | | | 370/330 |
| 2018/0199388 A1* | 7/2018 | Tabet | H04W 76/14 |
| 2019/0045483 A1* | 2/2019 | Tabet | H04W 72/30 |
| 2019/0045487 A1* | 2/2019 | You | H04W 72/0446 |

(Continued)

*Primary Examiner* — Chuong T Ho
(74) *Attorney, Agent, or Firm* — Kilpatrick Townsend & Stockton LLP

(57) ABSTRACT

A device-to-device (D2D) communication application is stored in a memory of a first device, and has an application identifier (ApplicationID) configured to enable D2D communication between two or more devices in proximity. The first device is configured with a user identifier (UserID). A group associated with the D2D communication application can then be established, which includes the first device and one or more second devices, each having the D2D communication capability and an associated UserID, each of the devices exchanging their ApplicationID and UserID with other devices to establish the group. A role in the group is assigned to each device of the first device and one or more second devices, which defines functions for each device to establish the D2D communications. Based on the role of each device, a set of resources from the network are allocated to enable the D2D communication on the D2D communication channel.

20 Claims, 11 Drawing Sheets

(56) References Cited

U.S. PATENT DOCUMENTS

| | | | |
|---|---|---|---|
| 2019/0090292 A1* | 3/2019 | Tabet | H04W 76/14 |
| 2021/0045093 A1* | 2/2021 | Rao | H04W 36/0009 |
| 2021/0219116 A1* | 7/2021 | Perras | H04W 4/08 |
| 2021/0282121 A1* | 9/2021 | Selvanesan | H04W 72/04 |
| 2021/0352648 A1* | 11/2021 | Yang | H04L 67/1055 |
| 2022/0330261 A1* | 10/2022 | Yeo | H04L 5/0053 |
| 2022/0361151 A1* | 11/2022 | Ding | H04W 28/26 |
| 2023/0050943 A1* | 2/2023 | Luo | H04W 72/542 |

* cited by examiner

NETWORK SLICING FRAMEWORK FOR TIME-SENSITIVE PEER-TO-PEER NETWORKING

This application claims priority to U.S. Provisional Patent Application No. 63/067,022 filed on Aug. 18, 2020 the disclosures of which are hereby incorporated by reference in their entirety and for all purposes.

BACKGROUND

Device-to-device (D2D) communication refers to any technology where two or more devices communicate with each other without traversing a base station (BS) or other parts of a core network of a wireless telecommunications system. While D2D technologies hold great promise for making communications easier and more efficient, especially for making ultra-low latency communication possible, the applications supported by such technologies are currently limited.

D2D communication, introduced in 2015 as a part of the Third Generation Partnership Project (3GPP), Release 12 (Rel-12) as Proximity Services (ProSe D2D), allowed Long-Term Evolution (LTE) devices to detect each other and to communicate directly. D2D communication, adapted as a technology known as "LTE Sidelink," was initially used only in a public safety context. LTE Sidelink was an adaptation of the core LTE standard that provides for communication between two or more nearby devices, but at that time, commercial application of D2D communication was not permitted by 3GPP.

In 3GPP Rel-14 and afterward, D2D communication is defined for some limited applications, including the automotive industry as Cellular Vehicle to Everything (C-V2X) communication, promising extremely high data rates of up to 1 Gbps, low latency (<10 ms), and very high reliability. This shift allowed LTE Sidelink to be used for other applications beyond C-V2X communication to enable peer-to-peer communications. However, currently, LTE Sidelink is limited to automotive applications.

In conventional wireless telecommunications systems, short range D2D technologies such as Bluetooth and Wi-Fi suffer from range and interference issues, while D2D cellular communication technologies currently in use, such as 3GPP Proximity Services (ProSe), can suffer from limitations that result from licensed spectrum usage.

SUMMARY

This disclosure introduces a network slicing framework for device-to-device (D2D) enabled, time-sensitive applications, and to enable peer-to-peer communication among multiple devices in one joint setting, e.g., an application, using new radio (NR) Sidelink (hereinafter "sidelink") features and mechanisms to accomplish the D2D communications.

In some aspects, a method includes the steps of discovering a set of devices in proximity and running a common device-to-device (D2D) communication application, each of the devices in the group of devices having a user identifier (UserID) and the D2D communication application having an application identifier (ApplicationID), the D2D communication application being configured to enable D2D communication between two or more devices in proximity, the D2D communication further being configured for D2D communication baseband resources of the network. The method further includes establishing a group of the set of devices, based on an exchange among the set of devices of each device's UserID and ApplicationID, and assigning a role to each device in the group of the set of devices, the role defining functions for each device to establish the D2D communications. The method further includes requesting, by at least one device in the group, communication resources from the network for the D2D communications during execution of the D2D communication application.

In other aspects, a system includes first device that includes a memory and one or more processors. The one or more processors are configured to store a device-to-device (D2D) communication application in the memory, the D2D communication application having an application identifier (ApplicationID) and being configured to enable D2D communication between two or more devices in proximity. The configuring further includes steps to configure the first device with a user identifier (UserID), and establish a group associated with the D2D communication application. The group includes the first device and one or more second devices, each of the one or more second devices having the D2D communication application and an associated UserID, each of the first device and the one or more second devices exchanging their ApplicationID and UserID with other devices of the first device and one or more second devices to establish the group. The configuring further includes steps to assign, based on execution of the D2D communication application, a role in the group to each device of the first device and one or more second devices, the role defining functions for each device to establish the D2D communications, and allocate, based on the role of each device, a set of resources from the network to enable the D2D communication.

The details of one or more aspects are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

DETAILED DESCRIPTION

This disclosure introduces a network slicing framework for device-to-device (D2D) enabled, time-sensitive applications. The methods and systems and devices described herein allow multiple user equipment (UE) to communicate directly with each other, with low latency and minimal interference. A UE is any device used by an end user to communicate, and can include a smartphone or other mobile computing device, a laptop computer, a tablet computer, or any other device that includes a broadband communication module. Each UE receives services through a Protocol Data Unit (PDU) session, which is a logical connection between each UE and a data network.

Figure 1:
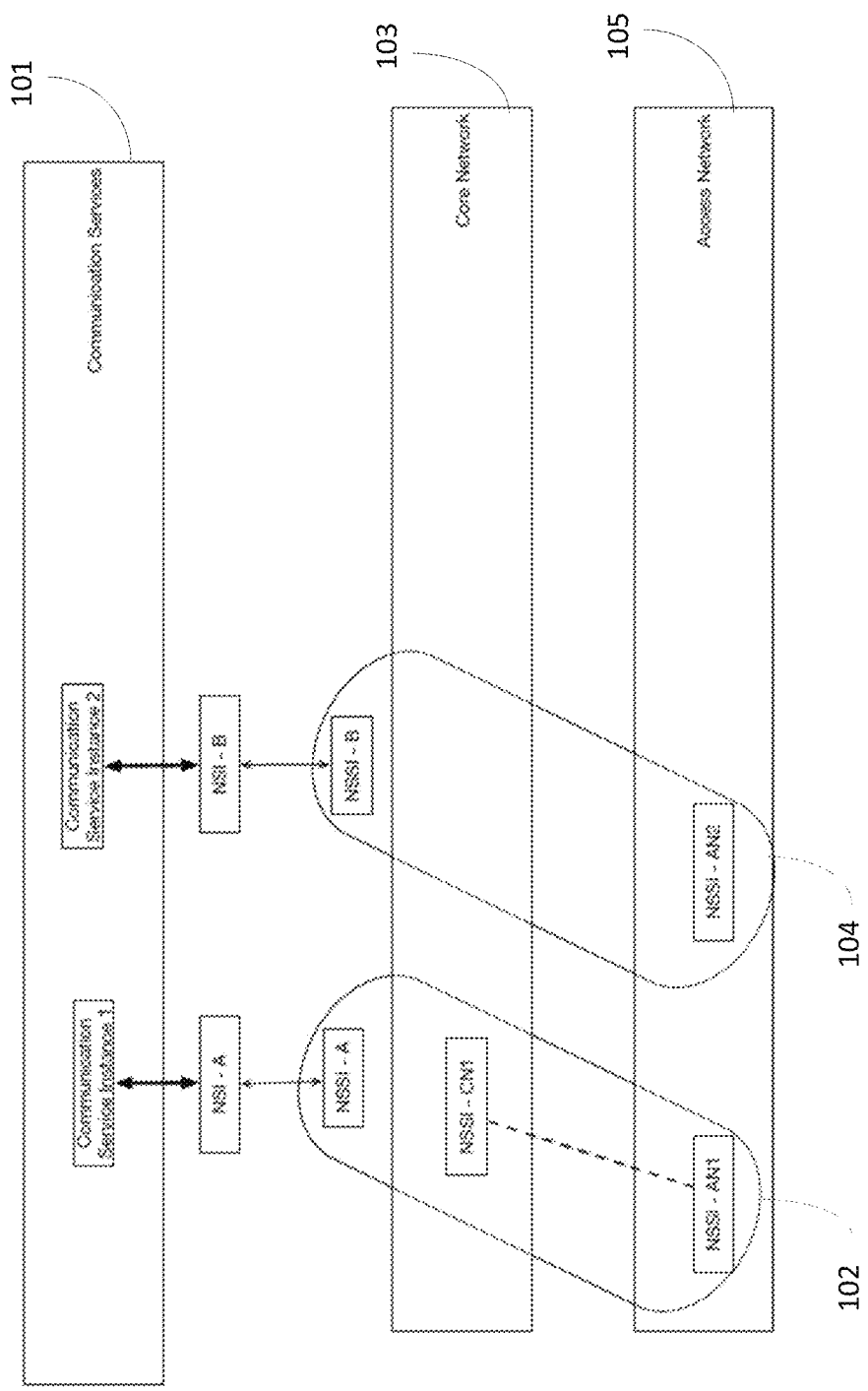
FIGS. 1-3 illustrate techniques for providing a network slice, setting up a data path for using a network slice in 5G, and for setting up a sidelink slice, respectively.
Figure 2:
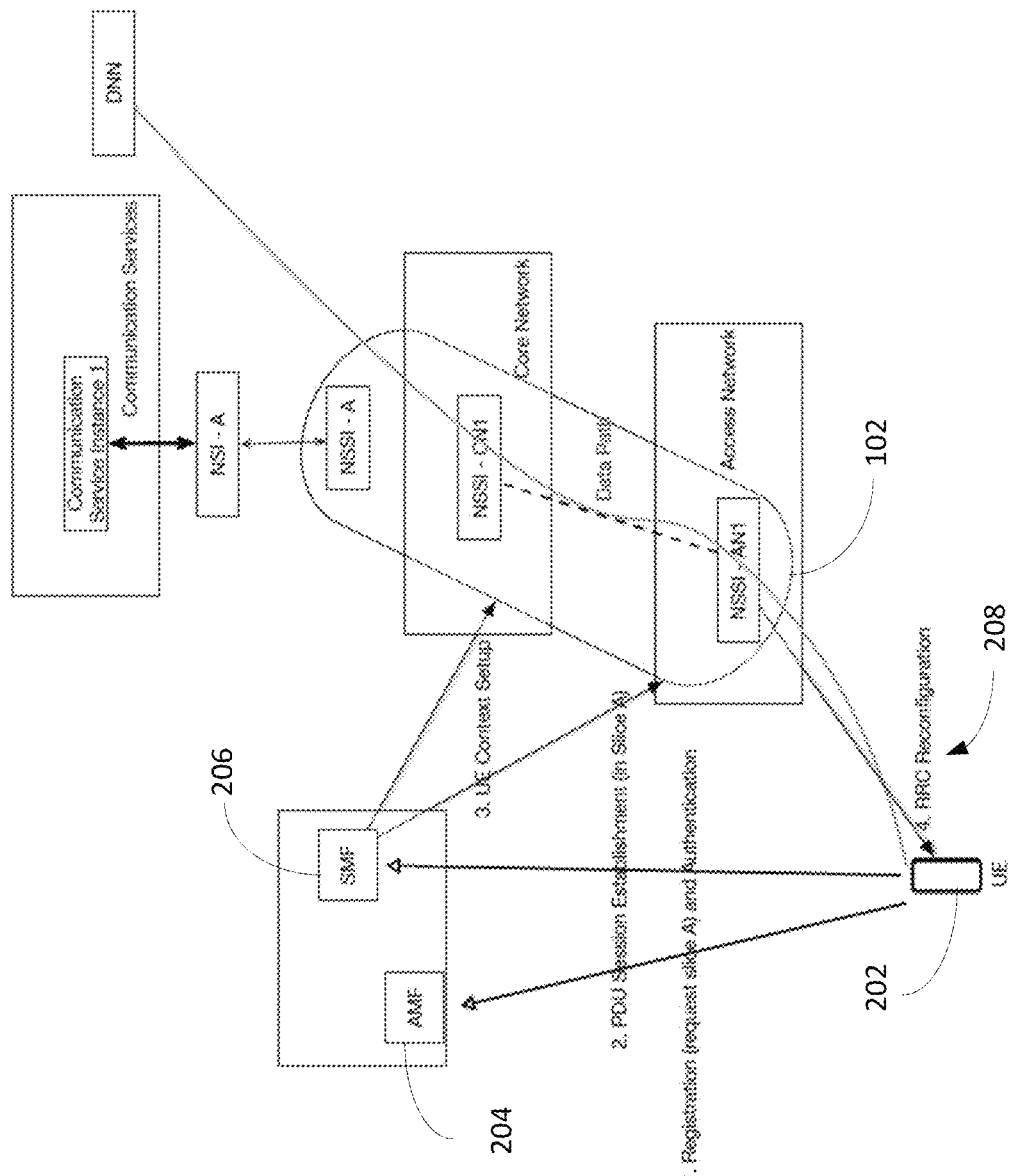
Figure 3:
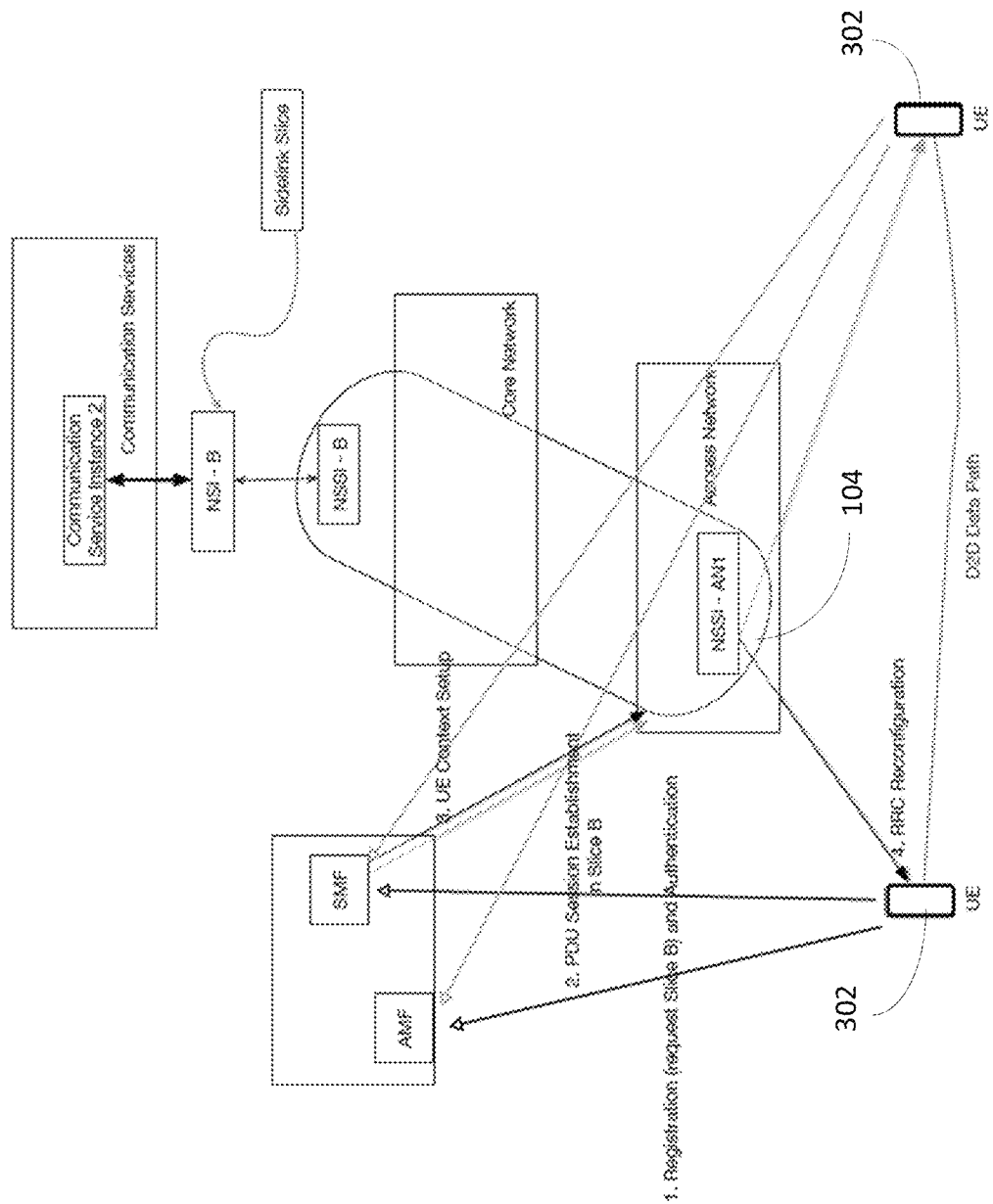

FIGS. 1-3 illustrate various techniques for providing a network slice, setting up a data path for using a network slice in 5G, and for setting up a sidelink slice, respectively. In 5G, network slicing, together with support for time-sensitive networking, enables a network to support new types of applications with varying needs on latency and time critical data transfer between a device and a network. Some of these applications, such as with live concerts, video gaming, and other events, would benefit from low latency transfer directly between peer devices.

A network slice is defined in the 5G architecture, in which 3GPP TS 28.530 defines the ways in which network slices can be offered as a service by Mobile Network Operator MNO). In some implementations, for peer-to-peer communication services, a network slice can be defined with resources only from a Radio Access Network (RAN). A RAN is a part of the mobile telecommunications system that implements radio access by multiple UE and a core network (CN) of wireless communications technologies.

These RAN resources are assigned to each UE for direct communication on the sidelink interface. As shown in FIG. 1, a Network Slice Instance A (NSI-A) 102 represents a network slice between a communication service instance 1 of communication services 101 and a Network Slice Subnet Instance (NSSI) of a RAN such as access network 105 (NSSI-AN1), which can be provided via an NSSI on a core network 103 (NSSI-CN1). A Network Slice Instance B (NSI-B) 104 represents a RAN-only slice, or "sidelink slice." This sidelink slice guarantees resource pools in the air interface reserved to meet Quality of Service (QoS) requirements expected of the slice. The NOPs can provide such a slice to a Communication Service Provider (CSP) or a Communication Service Customer (CSC).

FIG. 2 shows an example architecture for establishing a data path as a network slice for an application and external data network using 5G system procedures, such as a Network Slice Instance A (NSI-A) 102 shown in FIG. 1. A UE 202 performs registration and authentication with an Access and Mobility Function (AMF) 204, which is the single point of contact to the UE 202 for all slice related configurations. The UE 202 is allowed to use Slice A (a sidelink slice) by the network in a "Registration Accept" process by including Slice A in the list of allowed slices. In some implementations, the UE 202 can be authorized for using the network for a sidelink though its policies in a policy control function (PCF), which provides rules to the UE 202 to identify which traffic to send via which sidelink slice. The UE 202 triggers a PDU session establishment as configured by the application within the selected slice. Then, a session management function (SMF) 206 negotiates with the selected network functions of the requested slice, after which a radio resource control (RRC) 208 connection of the UE is reconfigured with resources for the data communication.

FIG. 3 illustrates extending the same steps described above for establishing a D2D link or data path, such as a Network Slice Instance B (NSI-B) 104 shown in FIG. 1. Here, two UEs 302 that are used to establish the D2D link go through the sequence of actions with the network control functions, as described in reference to FIG. 2, in order to have a D2D link established between them.

However, when multiple users are building a group and sharing data among each other, resource utilization can be further optimized. In this scenario, there is at least one UE 302 that is an aggregator/controller of a group communication. In addition, there are one or more UEs generating and transmitting data to the aggregator/controller UE, and there are one or more UEs which are receiving the processed data from the aggregator/controller. In some deployments, the same UEs perform both functions of data generator and data receiver. In some other deployments, the processed data to all the receiver UEs are the same requiring broadcast of processed data. Yet other deployments require the different output streams to the receiver UEs requiring unicast connections.

In some implementations, using current network settings, each member of the group can be controlled and administered by the network. This may result in unnecessary signaling, and an increase of end-to-end latency that might be critical for time-sensitive applications. Accordingly, systems and methods described below are configured to optimize assigned network slices for latency-sensitive applications shared among multiple devices at the same time.

Figure 4:
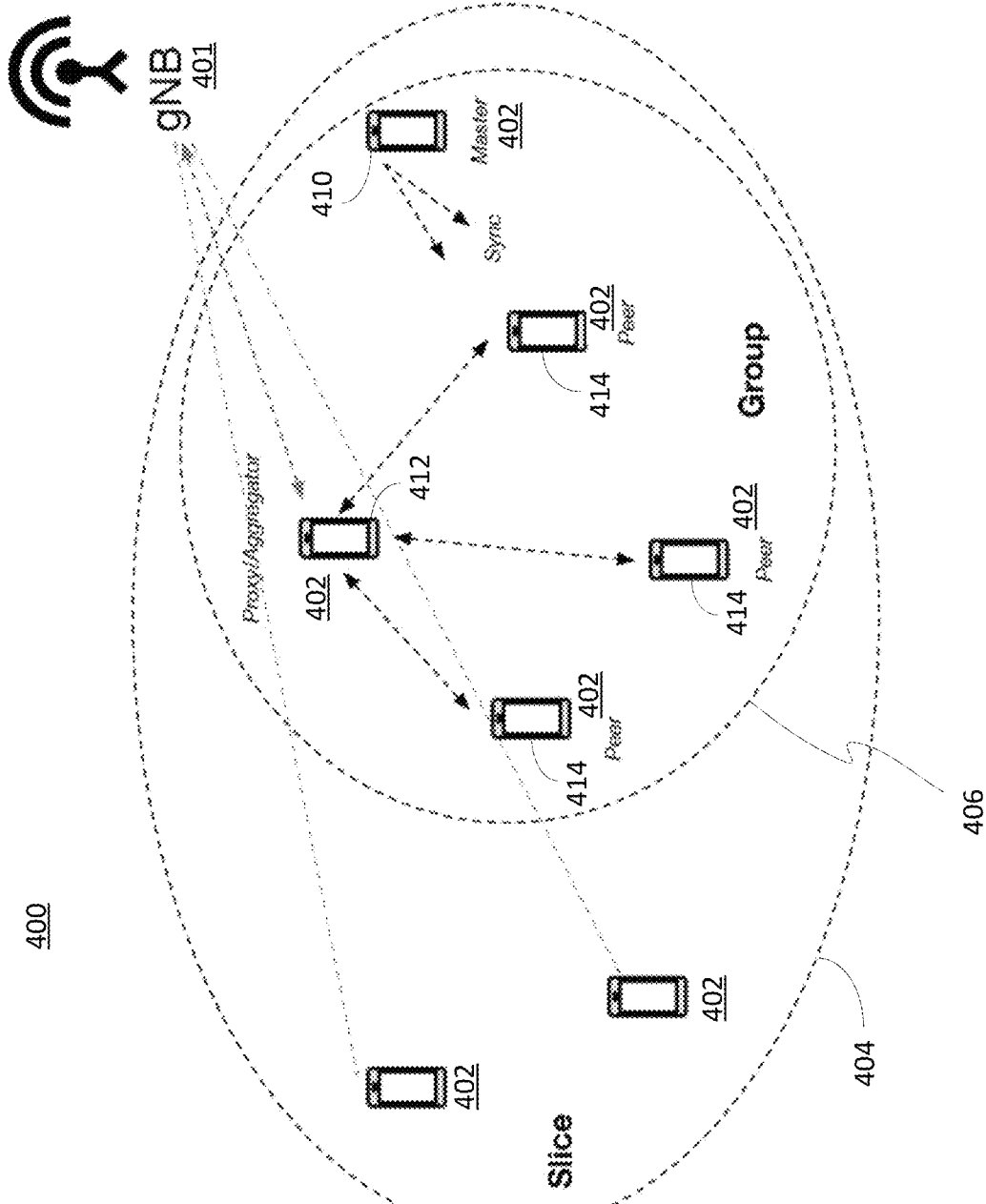
FIG. 4 illustrates a network slicing framework for D2D-enabled time-sensitive applications between multiple user equipment (UE)

FIG. 4 illustrates a network slicing framework 400 for D2D-enabled, time-sensitive communications between multiple user equipment (UE) 402, using a sidelink slice 404 or a group slice 406, which can be a subset of the sidelink slice 404 of the core network 401, denoted as Next Generation NodeB (gNB), which in 5G is the logical radio node, and based on a definition of a group as described further below.

The framework 400, and systems and methods based thereon, incorporate the following principles. User discovery is performed where only authorized users discover each other by exchanging a pre-configured application identifier (applicationID) and/or user ID. For instance, in the sidelink slice 404 or group slice 406, user discovery can be based on pre-configured or real-time configured slice/group-UserID/ApplicationID mapping by the operating system of each UE, or by the application associated with the applicationID.

During group establishment, which defines the group slice 406, each UE 402 is assigned a specific role in the group. According to some implementations, and as exemplified in FIG. 4, each UE 402 device in the group associated with the group slice 406 can be assigned a role as master 410, proxy and/or aggregator 412, or peer 414, the roles and functions of which are described in further below. The proxy/aggregator 412 can be the same device, or different devices. Such assignment enables group establishment within the sidelink slice 404 using out of band and common sidelink resources.

In some implementations, a Protocol Data Unit (PDU) session, of type "Group D2D Communication," is established on the sidelink slice 404, where the proxy UE 412 of a group 406 performs session management procedures with the core network (gNB) 401. This includes negotiation of aggregated resource requirements for the group 406, and an indication of group membership of the UE 402 (addition/modification/removal, etc.) to the core network 401.

Intra-group sidelink resource allocations can be made by the Aggregator UE 412 by virtue of its knowledge about the communication requirements in the group. The Aggregator UE 412 performs resource assignment to the peer UEs 414 of the group either as dedicated reserved resources for group communication, or as dynamic grants to the peer UEs 414 for group communication.

Network slicing systems, methods and a framework for D2D-enabled, time-sensitive communications, can be implemented as further described below, and which can include following processes:

Device and Group Discovery

In some implementations consistent with the subject matter described herein, slice sharing is application-based. Accordingly, UEs are pre-configured, or configured on-the-fly (e.g. when an application is downloaded and/or run on a UE), with an application identifier (ApplicationID) and a user identifier (UserID) for all UE devices that share the application. The ApplicationID can be associated with an application running locally on each particular UE. The UserID can be associated with a user of the UE device, or with the device itself. During a discovery phase, involved UE devices can exchange a sequence of discovery messages, where each discovery message includes one or both of the ApplicationID and UserID.

In some implementations, the UE device initiating the discovery sends, as part of the discovery messages, a discovery request, which includes one or both of the requesting UE's ApplicationID and UserID. Each UE device that replies to the discovery request replies with a discovery confirmation, including one or both of its ApplicationID and UserID.

In some implementations, one or more devices in a group can act as an announcing UE, where other devices in the group can act as listening UEs. To enable discovery of groups of UEs belonging to the same slice or group, a mapping can be established in each UE so that when using discovery resources for potential member discovery, the announcing UE's UserID is mapped to a group identification, or associated slice identification, e.g. the Network Slice Selection Assistance Information (NSSAI), which represents a collection of NSSAIs by which UEs can access one or more network slices at any given time.

UEs belonging to the same UserID can discover each other, as one or multiple UEs act as announcing UE. The UserID-to-group/slice identification mapping can be preconfigured to the listening UE, or configured dynamically by the network via RRC reconfiguration if the listening UE is in coverage. In case both preconfigured mapping and dynamically configured mapping for the same NSSAI both exist in a UE, the preconfigured mapping takes precedence. In yet other implementations, the announcing UE's ApplicationID is mapped to the group or slice identification, similarly as described above using UserID.

D2D Group Initiation/Establishment

A D2D group establishment for a sidelink communication path 404 (e.g. "group sidelink 406" shown in FIG. 4) for time-sensitive data can be set-up or initiated as an event-triggered action. A device-internal event (such as, for example, power-up by a UE) triggers a discovery procedure by which the UE device associates with a group. In some implementations, the initiation may be user relationship based, e.g. family, friends, neighbors, etc. In other implementations, an explicit user input triggers the discovery procedure and establishment of a group, such as UE devices belonging to one UserID discovers other devices in a geographical or network proximity.

In yet other implementations, a group initiation can be application-triggered. A specific application, such as a video game, virtual reality/augmented reality (VR/AR), a live performance or other event, etc., starts up the procedure for discovery of other devices in the group. In some implementations, the group initiation along with discovery may be performed based on out-of-band protocols, e.g. Bluetooth (BT), WiFi, etc.

In other implementations, the group initiation is performed by transmission on existing common sidelink resource pool. In these implementations, UEs that are used to initiate a group or join a group broadcast a group initiation/join message including the ApplicationID or UserID associated with the group or slice identification.

Device Role Selection

In this step, devices roles are established. As shown in FIG. 4, device roles can be assigned to each UE device, and defined as follows. The proxy 412 is the main, and only, device that is registered and communicating with the network for the PDU session and sidelink resources. The proxy 412 negotiates resource requirements of all members with the network 401. The master 410, or "master clock device," is the main synchronization source of a clock to which all UE in the group 406 are synchronized. The aggregator collects all information from other devices in the group, process and distributes to its peers. Lastly, each peer 414, or "peer devices," are other members of the group 406 that transmit and/or receive the data.

In some implementations, one UE device 402 can be assigned, or assume, the role of proxy 412, master 410 and aggregator 412 at the same time. A device characteristic (type of device) can be used as the input for role selection, such as, for example, a number of peer devices 414 that are transmitting the data. A certain number of other peer devices 414 can have a configuration of a data receiver. In preferred implementations, one device is designated as the master 410 or Master Clock device. A group can be successfully established only when at least one UE 402 device takes over the roles of master 410, aggregator/proxy 412, and proxy 414. When there is more than one device configured as aggregator 412, a negotiation can be performed, based on levels of services (LOSs) being offered. In other implementations, current channel conditions experienced by the devices are taken as a criterion for role selection.

In yet other implementations, a group consists of a proxy 412 UE that negotiates with the network 401 for resources and a number of one or more peer UEs that are engaged in D2D message exchange between the peer UEs. The proxy may also participate in D2D message exchange in the role of a peer UE.

Network Interaction

Figure 5:
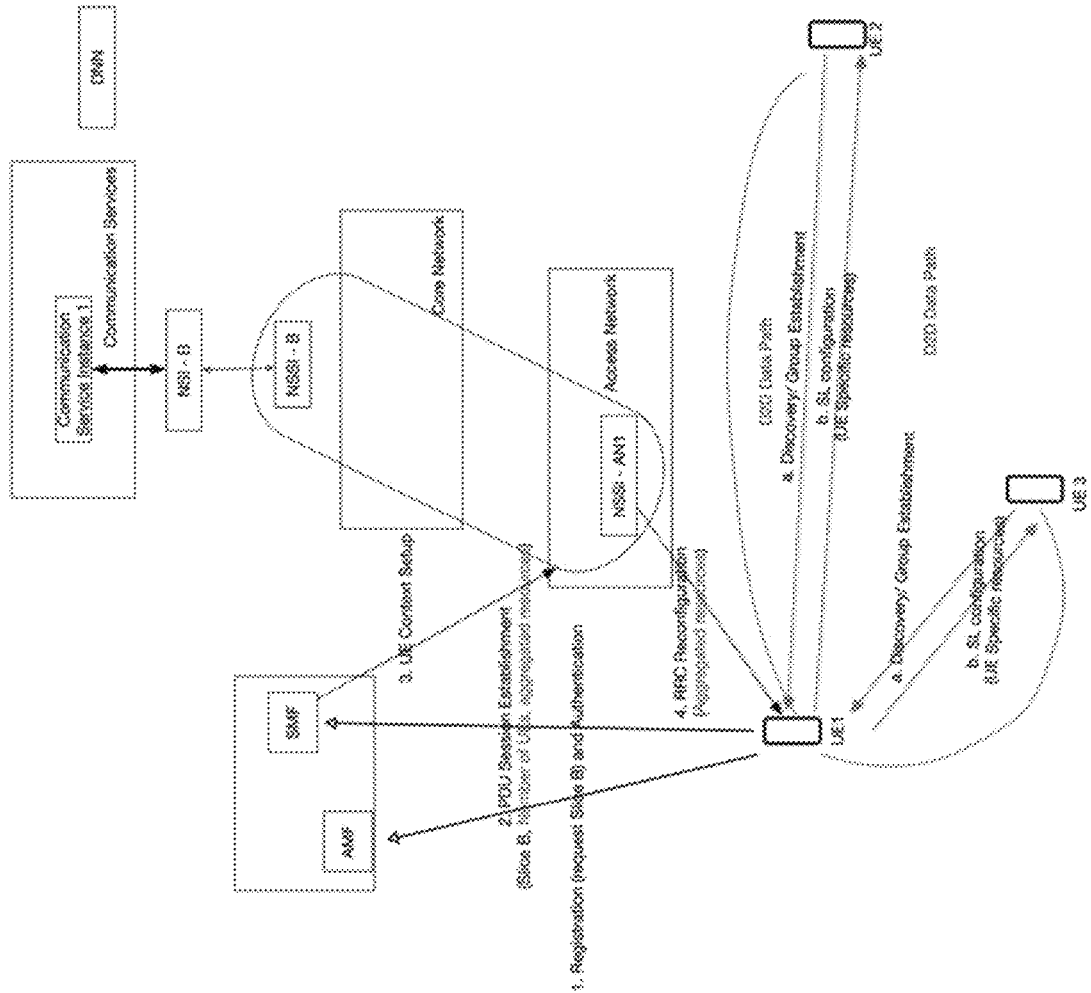
FIG. 5 illustrates a D2D data path setup in accordance with some implementations of the subject matter described herein.

In accordance with implementations described herein, UE-network interaction for setting up the direct communication, or sidelink, path between multiple UEs is shown in FIG. 5. In this group, UE1 is provided the role of aggregator/controller. UE1 is registered with the network and allowed to use slice B. UE2 is another member of the group with the role of data generator. UE3 is yet another member of the group with the role of data receiver. UE1, UE2 and UE3 discover and establish a group directly, while UE2 and UE3 are not subscribers to the network. An application in UE1 triggers a PDU session establishment for D2D group communication. In this step, UE1 acts as a proxy for UE2 and UE3 and can make aggregated requests for resources.

Figure 6:
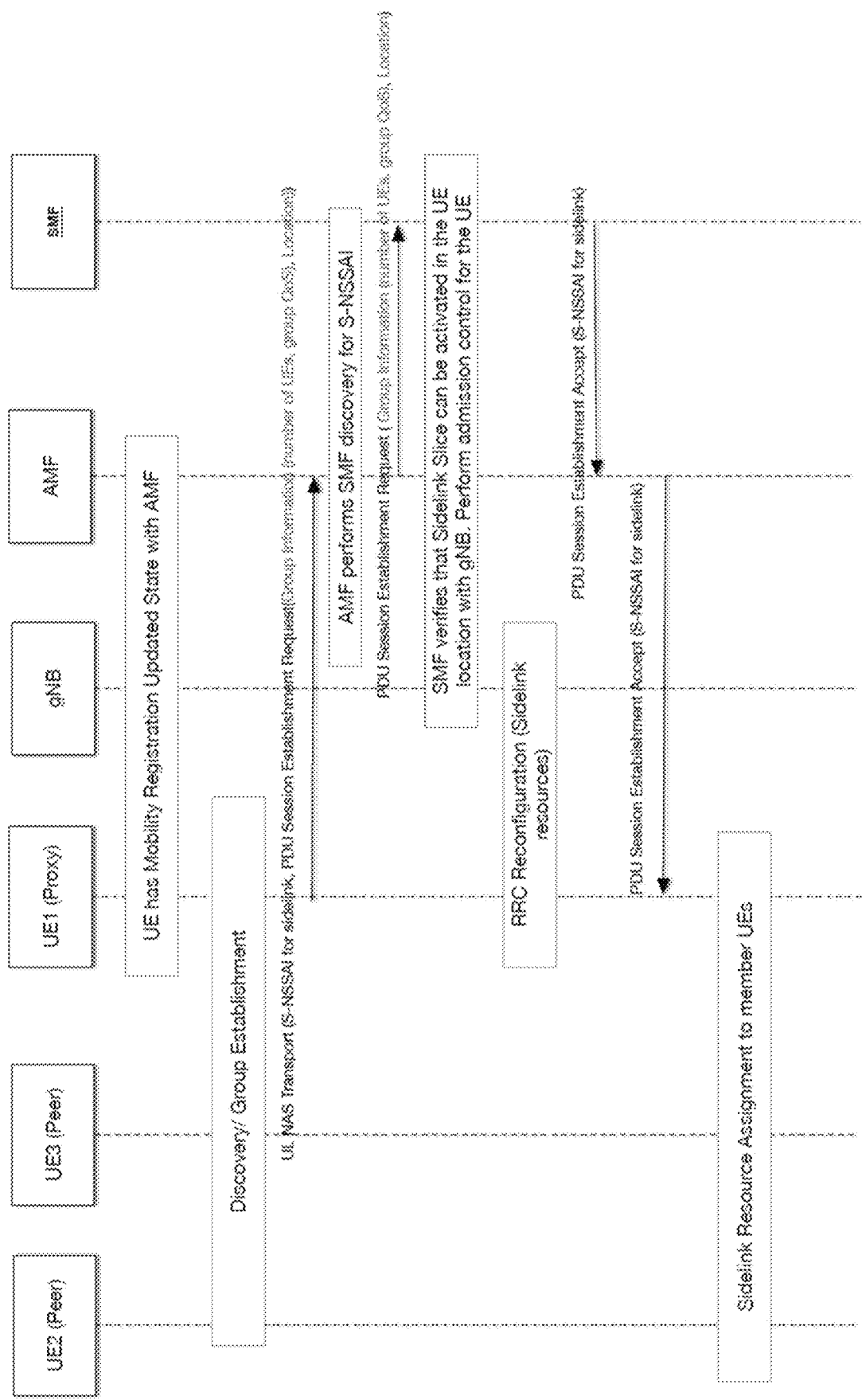
FIG. 6 shows a message sequence for establishing and initiating a D2D group communication.

A message sequence for establishing and initiating a D2D group communication from one or more UEs and a core network is shown in FIG. 6. The core network includes the gNB, an Access and Mobility Management Function (AMF), and a Session Management Function (SMF), among other components. The SMF is primarily responsible for interacting with the decoupled sidelink slice, by creating, updating and removing Protocol Data Unit (PDU) sessions, and managing session context with a User Plane Function (UPF) that defines the sidelink slice. The AMF receives requests for new PDU sessions, and handles anything to do with connection or mobility management while forwarding session management requirements over an N11 interface to the SMF. The AMF determines which SMF is best suited to handle the PDU Session establishment request.

As shown in FIG. 6, the UE designated as a proxy can request to establish a PDU Session on the sidelink slice. The sidelink slice is identified by an extension (SST value 5) to the SST parameter as follows:

| Slice/Service type | SST | Characteristics |
| --- | --- | --- |
| eMBB | 1 | Slice suitable for the handling of 5G enhanced Mobile |
| URLLC | 2 | Slice suitable for the handling of ultra-reliable low latency |
| MIoT | 3 | Slice suitable for the handling of massive IoT. |
| V2X | 4 | Slice suitable for the handling of V2X services. |
| Sidelink | 5 | Slice suitable for the handling of commercial D2D services |

The sidelink value (SST 5) identifies an individual slice instance of the specific Communication Service Provider. Together, the SST and SD constitute a Single-Network Slice Selection Assistance Information (S-NSSAI) that the proxy UE includes in its PDU Session establishment procedure. A PDU session establishment message includes additional parameters for a PDU session for D2D group communications. These parameters include, but are not limited to: i) type of PDU session, e.g. "group D2D communication;" ii) group identifier; iii) number of UEs in the group; iv) QoS for group communication, aggregated resource requirement for the group including, but not limited to v) location, and/or vi) group mobility information.

In the case where the type identifies the session as a PDU session that does not connect to an external data network name (DNN), the data from D2D group communication PDU session does not flow through core network entities. The costs associated which such a PDU session, e.g., from a wireless carrier or other service provider by a user of the UE, can be based on resource allocation reported by a base station or a node (e.g., gNB) at the release of PDU Session. A base station can be one of any number of types of base stations, such as a Node Bs, eNodeBs, HeNBs, eNBS, gNBs, gNodeBs, macrocells, microcells, small cells, femtocells, etc. Location information can be used by the next-generation RAN (NG-RAN) to identify which other nodes, e.g., next generation NodeBs (gNBs) would assign sidelink resources for the group. The resource identification takes care of the scenario that not all member UEs are under the coverage of gNB.

Group mobility information indicates whether the group is expected to be mobile during the group communication. This allows the network to reserve resources in a semi-persistent manner for a stationary group. The gNB assigns the aggregated resources to proxy UE (UE1) through RRC Reconfiguration. The sidelink resources are communicated by the proxy UE to the group members.

Resource Allocation to a Group of UEs

The time-sensitive communication between the group of UEs requires special consideration of the nature of resources allocated to the group. The resources are reserved to a group to meet the latency needs. This avoids the need for sensing operation and signaling with the gNB to schedule grants.

Resource Allocation within the Group by an Aggregator

The peer group for time-sensitive communication has special requirements on timing of resources for transmission and reception. The aggregator is configured with knowledge of the requirements of the group, and controls the resource scheduling for the group members with the following two principles: first, transmission resources for data generating devices are scheduled such that aggregator wait time before processing is zero or minimal. In some implementations, the transmission resources are synchronized to be on the same slot but spread across frequency domain of the NR frame structure. Second, transmission resources for the aggregator are scheduled such that wait time for processed data is zero or minimal before transmission. In this example, the resource request is made for two sets of semi-persistent scheduling with an offset between the allocations that matches the aggregators' processing delay.

Sidelink Resource Request/Assignment

Figure 7:
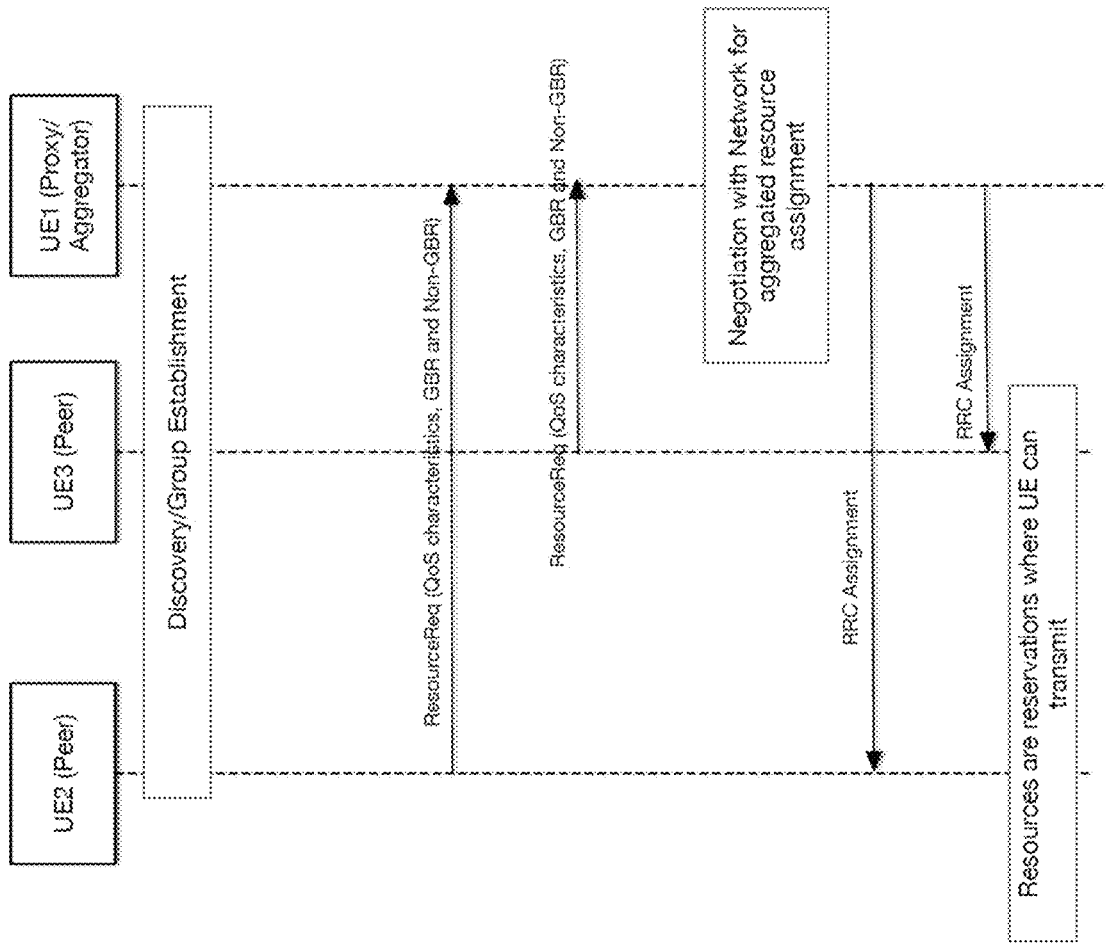
FIG. 7 shows a message sequence for reserved transmission occasions for peer UEs.

The resource assignment to the members within the group is controlled by the aggregator. The peer UEs communicate their QoS characteristics to the aggregator UE. The combined resource request is negotiated with the network through the Proxy UE. The aggregated resource assigned by the network is allocated per peer UE by the aggregator UE. In the message sequence diagram shown in FIG. 7, this interaction is shown (e.g. the same UE is playing the roles of aggregator and proxy). Here, the individual resource assignment are reservations where the peer UE can transmit without further delay.

Figure 8:
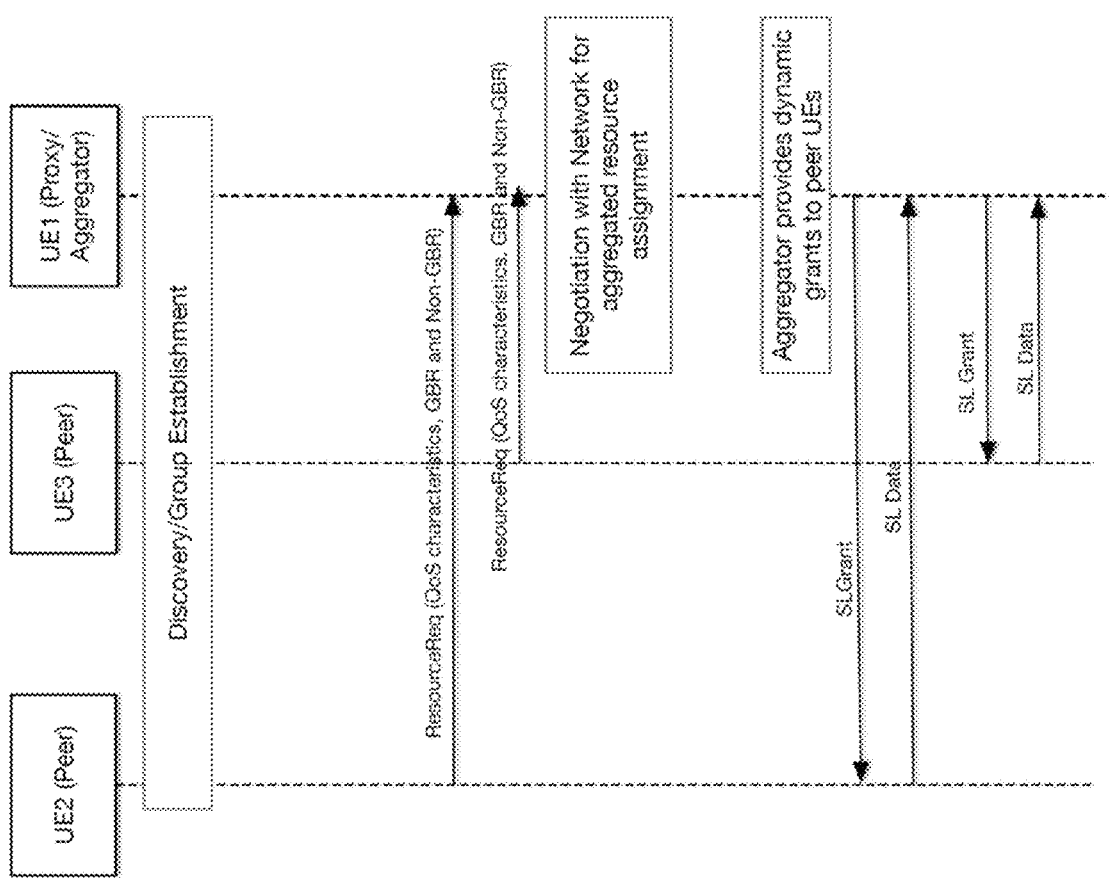
FIG. 8 shows a message sequence for dynamic grants by an aggregator UE.

In other implementations, illustrated in FIG. 8, the aggregator UE dynamically grants resources for other peer UEs to transmit. In this case, the aggregator is aware of the peer UEs' resource requirement, and the aggregator UE controls the transmission opportunities for peer devices. This method gives more control to the aggregator to vary the QoS assignments for different peer UEs.

In some implementations, the slicing resources are non-exclusively assigned to time-sensitive applications. In this case, negotiation with network for aggregated resource assignment is embedded into the 3GPP signaling framework. In other implementations, the slicing resources are exclusively assigned to a time-sensitive application. In the latter case, the negotiation with the network for aggregated resource assignment is a proprietary interaction between the application owner and the network provider.

Group Member Modification

Figure 9:
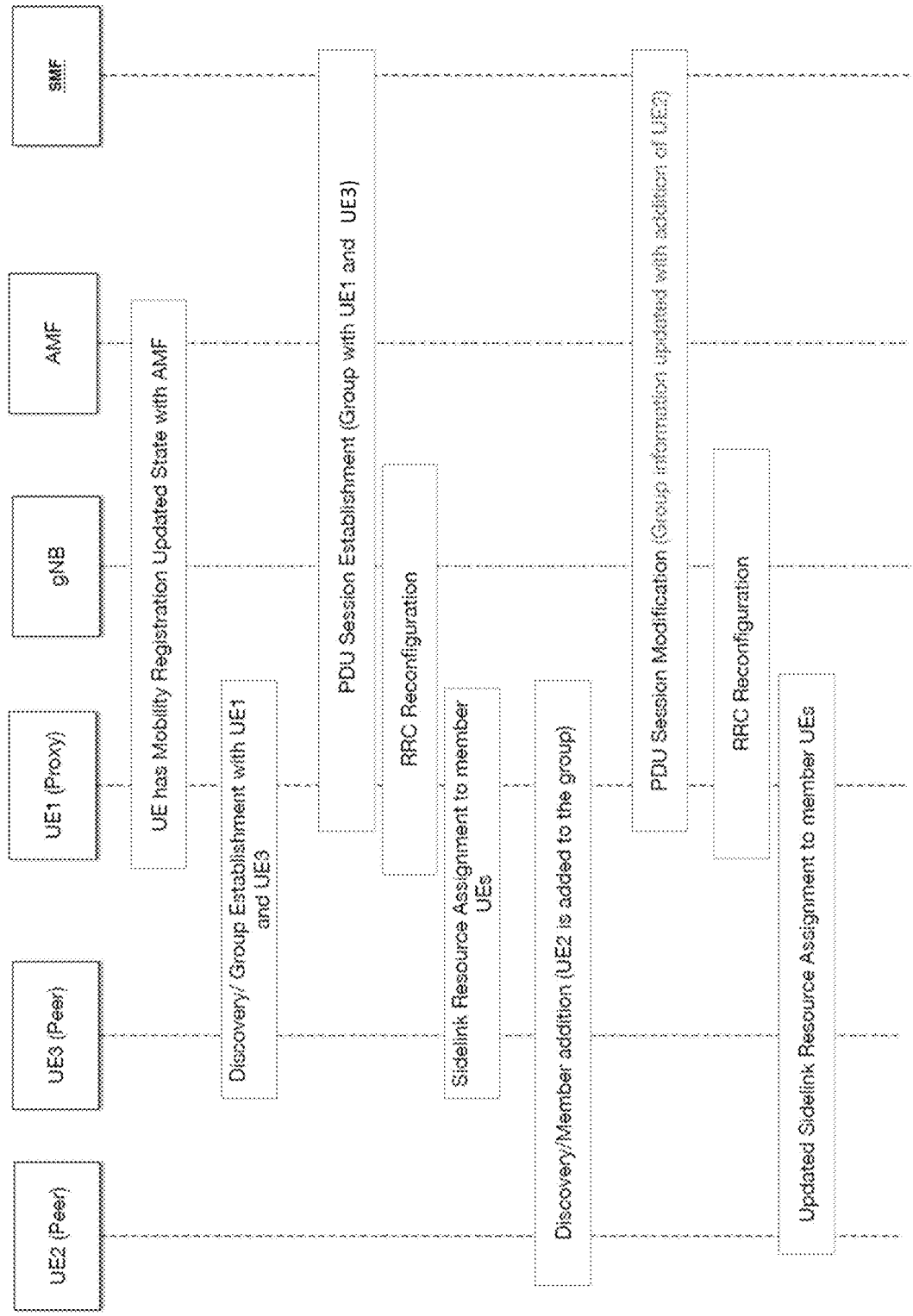
FIG. 9 shows a message sequence for the interaction when UE2 is added to a group already established between UE1 and UE3.

The message sequence shown in FIG. 9 shows the interaction when UE2 is added to a group already established between UE1 and UE3. UE2 performs a discovery procedure and is added to the group. The proxy UE (UE1) initiates a PDU session modification request towards SMF to reflect the changed QoS requirements. This results in RRC Reconfiguration for the assignment of radio resources. The sidelink resources are distributed by the Proxy UE to the members.

Implementation Examples

The proposed framework can be applied to many different applications utilizing D2D communication in a coordinated manner. Described below are two examples of implementation of the above architecture:

Concert Audio Production

Figure 10:
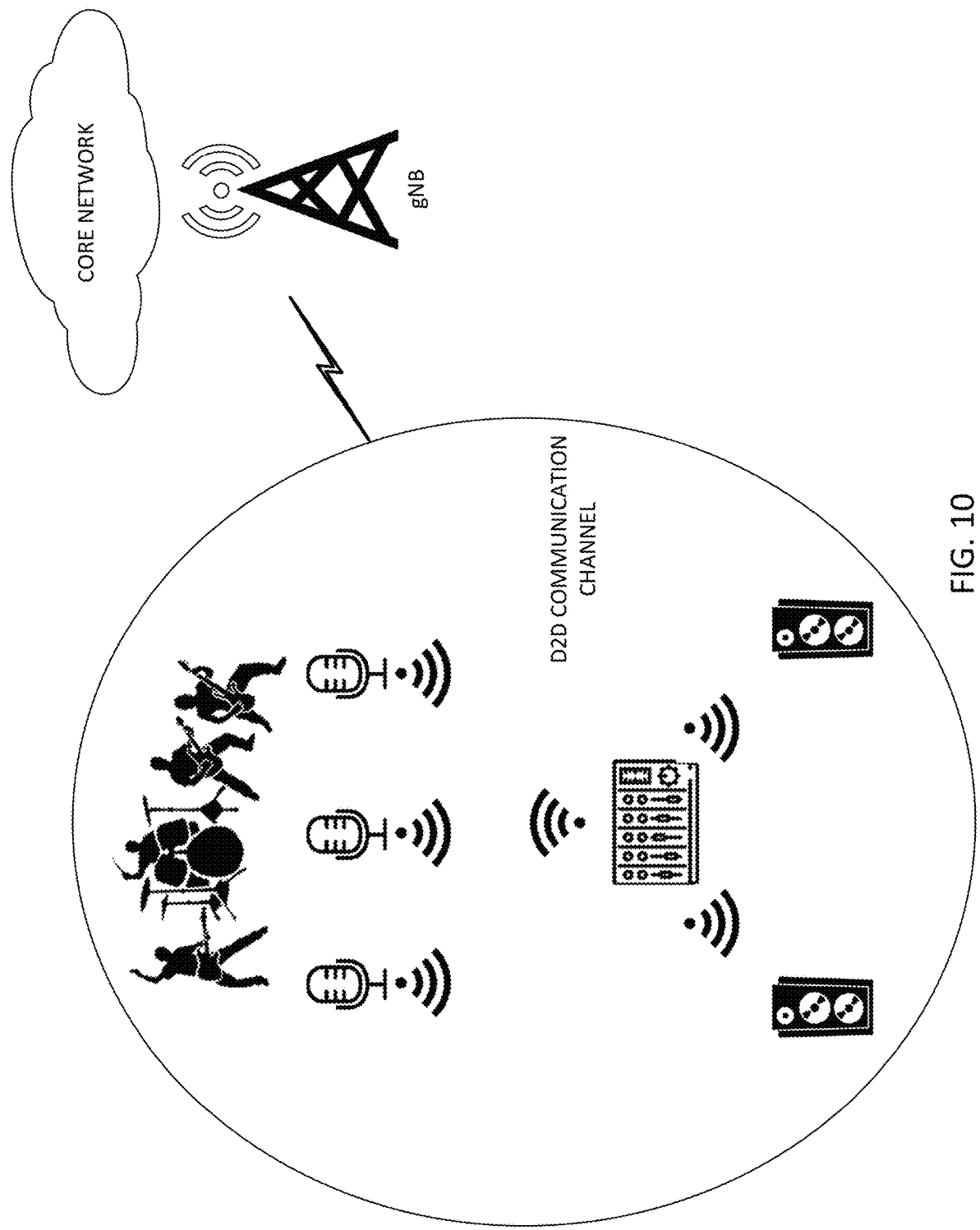
FIG. 10 illustrates an implementation of the current subject matter for concert audio production using D2D communication.

An exemplary concert audio production network is shown in FIG. 10. In some implementations, the link between the audio input devices (microphones) and the mixer console is by analog cables or wired Ethernet. The mixer or audio console processes the individual input streams. The processed output is sent through cables/wired Ethernet from the mixer to the monitors, speakers, or public address (PA) system.

With the above architecture, the UE can be configured as the mixer/console, assumes the role of aggregator/controller, and acts as a proxy for the group towards the corenetwork. The audio input devices can be assigned the role of data generators, and the PA speakers are the data receivers in this group.

Live Multi-Track Recording

Figure 11:
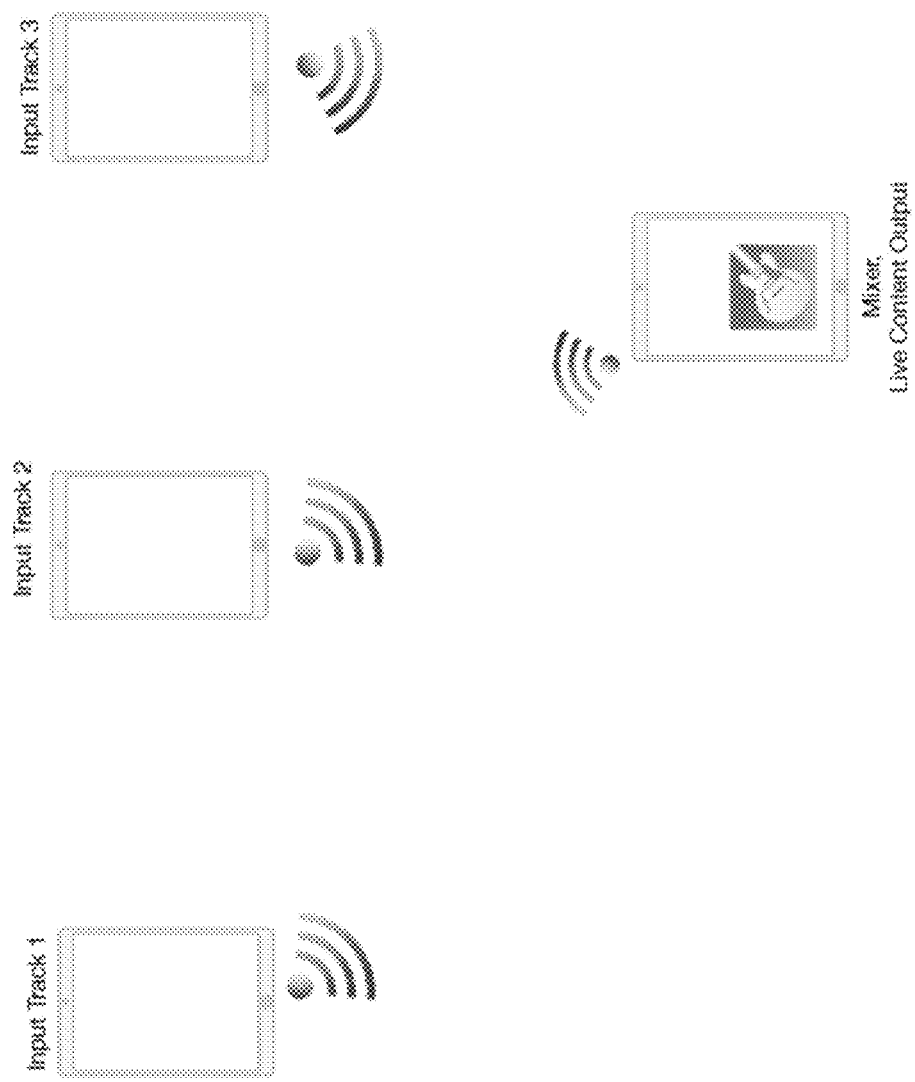
FIG. 11 illustrates an implementation of the current subject matter for multi-track recording using NR D2D communication.

The ability to perform low latency data transfer between UE devices can also be used to extend audio communication applications, such as music streaming applications or audio creation applications. In an exemplary implementation, shown in FIG. 11, a UE such as a tablet computer can be running a sound production and recording application, and used as a mixer (e.g. the Aggregator UE) to record multi-track content or to upload it to applications for live streaming. Multiple other UE devices, such as other tablet computers or mobile phones (peer UEs) can act as remote input devices (either using in-built microphones or connected to compatible professional microphones) to allow a live multi-track recording. The devices form a group of UEs engaged in D2D communications, such as using NR sidelink resources or other D2D communication channels.

Multi-Camera Video Production

Another exemplary implementation of the above architecture can be applied in a multi-camera, live video production using multiple UE devices. In a group of UEs, one configured as an aggregator running a video processing application or other video capture and processing software. The input devices, such as tablet computers, can be used to capture multi-angle video. The video streams are transferred to an aggregator UE using a D2D communication channel as described herein, for low-latency communication. Video editing software in the aggregator UE can be configured to produce live content from the input streams of peer UE.

Although a few aspects have been described in detail above, other modifications are possible. Other aspects may be within the scope of the following claims.

The invention claimed is:

1. A first device for device-to-device communication via a network, comprising:
a memory; and
one or more processors configured to:
store a device-to-device (D2D) communication application in the memory, the D2D communication application having an application identifier (ApplicationID) and being configured to enable D2D communication between two or more devices in proximity, the configuring further including:
configure the first device with a user identifier (UserID);
establish a group associated with the D2D communication application, the group comprising the first device and one or more second devices, each of the one or more second devices having the D2D communication application and an associated UserID, each of the first device and the one or more second devices exchanging their ApplicationID and UserID with other devices of the first device and one or more second devices to establish the group;
assign, based on execution of the D2D communication application, a role in the group to each device of the first device and one or more second devices, the role defining functions for each device to establish the D2D communications, the role assigned from a set of roles comprising:
a proxy, configured as a device that is registered and communicating with a network for protocol data unit (PDU) session and D2D communication resources, based on resource requirements of all devices in the group; and
a Master Clock Device for synchronization sources among all devices in the group; and
allocate, based on the role of each device, a set of resources from the network to enable the D2D communication.

2. The first device in accordance with claim 1, wherein the set of roles further comprises
an aggregator that collects all information from other devices in the group, processes the information, and distributes the information to other devices.

3. The first device in accordance with claim 1, wherein the set of roles further comprises peer devices configured to transmit and/or receive information from other devices.

4. The first device in accordance with claim 1, wherein the network is a network slice of a core network.

5. The first device in accordance with claim 1, wherein the network is a sidelink slice of a core network.

6. The first device in accordance with claim 1, wherein establishing the group comprises triggering establishment of a PDU session.

7. The first device in accordance with claim 6, wherein triggering establishment of a PDU session comprises causing a session management function to negotiate with network functions of the network to reconfigure a radio resource control connection with resources for the D2D communication.

8. A method comprising:
storing a device-to-device (D2D) communication application in a memory of a first device, the D2D communication application having an application identifier (ApplicationID) and being configured to enable D2D communication between two or more devices in proximity, the configuring further including:
configuring the first device with a user identifier (UserID);
establishing a group associated with the D2D communication application, the group comprising the first device and one or more second devices, each of the one or more second devices having the D2D communication application and an associated UserID, each of the first device and the one or more second devices exchanging their ApplicationID and UserID with other devices of the first device and one or more second devices to establish the group;
assigning, based on execution of the D2D communication application, a role in the group to each device of the first device and one or more second devices, the role defining functions for each device to establish the D2D communications, the role assigned from a set of roles comprising:
a proxy, configured as a device that is registered and communicating with a network for protocol data unit (PDU) session and D2D communication resources, based on resource requirements of all devices in the group; and a Master Clock Device for synchronization sources among all devices in the group; and allocating, based on the role of each device, a set of resources from the network to enable the D2D communication.

9. The method in accordance with claim 8, wherein the set of roles further comprises an aggregator that collects all information from other devices in the group, processes the information, and distributes the information to other devices.

10. The method in accordance with claim 8, wherein the set of roles further comprises peer devices configured to transmit and/receive information from other devices.

11. The method in accordance with claim 8, wherein the network is a network slice of a core network.

12. The method in accordance with claim 8, wherein the network is a sidelink slice of a core network.

13. The method in accordance with claim 8, wherein establishing the group comprises triggering establishment of a PDU session.

14. The method in accordance with claim 13, wherein triggering establishment of a PDU session includes causing a session management function to negotiate with network functions of the network to reconfigure a radio resource control connection with resources for the D2D communication.

15. A method comprising:

discovering a set of devices in proximity and running a common device-to-device (D2D) communication application, each device in the set of devices having a user identifier (UserID) and the D2D communication application having an application identifier (ApplicationID), the D2D communication application being configured to enable D2D communication between two or more devices in proximity, the D2D communication being configured for D2D communication baseband resources of a network;

establishing a group of the set of devices, based on an exchange among the set of devices of each device's UserID and ApplicationID;

assigning a role to each device in the group of the set of devices, the role defining functions for each device to establish the D2D communications, the role assigned from a set of roles comprising:

a proxy, configured as a device that is registered and communicating with the network for protocol data unit (PDU) session and D2D communication resources, based on resource requirements of all devices in the group; and a Master Clock Device for synchronization sources among all devices in the group; and requesting, by at least one device in the group, communication resources from the network for the D2D communications during execution of the D2D communication application.

16. The method in accordance with claim 15, wherein the set of roles further comprises an aggregator that collects all information from other devices in the group, processes the information, and distributes the information to other devices.

17. The method in accordance with claim 15, wherein the set of roles further comprises peer devices configured to transmit and/or receive information from other devices.

18. The method in accordance with claim 15, wherein the network is a network slice of a core network.

19. The method in accordance with claim 15, wherein the network is a sidelink slice of a core network.

20. The method in accordance with claim 15, wherein establishing the group comprises triggering establishment of a PDU session.

* * * * *